June 9, 1942.  T. PARKER  2,285,870
HINGE ASSEMBLY FOR THE BUCKETS OF DREDGER CHAINS
Filed July 10, 1940  2 Sheets-Sheet 1
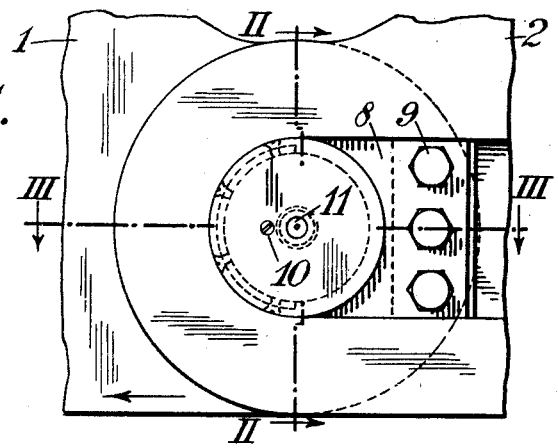
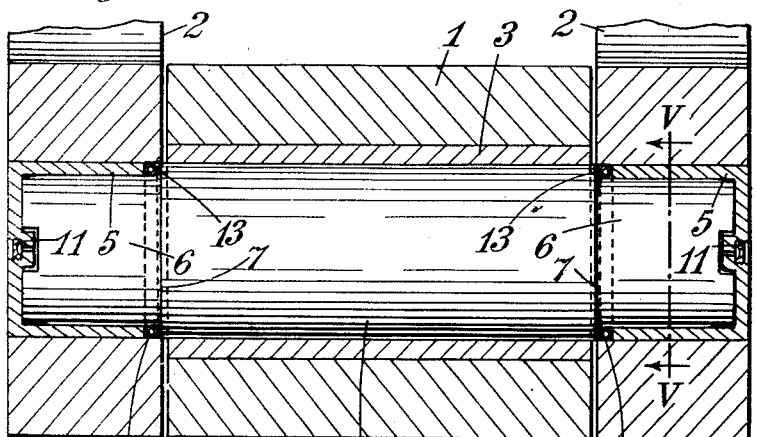
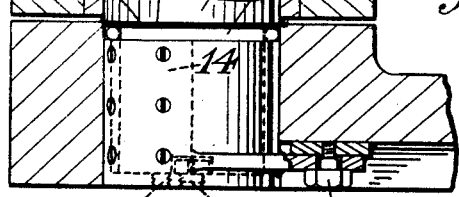
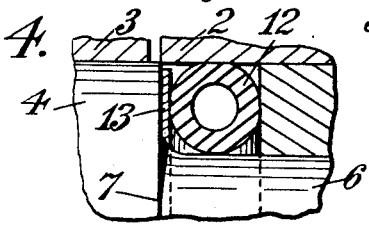
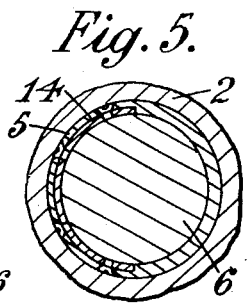
Thomas Parker
by his attys.
Stebbins and Blenko June 9, 1942. T. PARKER 2,285,870

HINGE ASSEMBLY FOR THE BUCKETS OF DREDGER CHAINS

Filed July 10, 1940 2 Sheets-Sheet 2

Thomas Parker
by his attys.
Stebbins and Banker

Patented June 9, 1942

2,285,870

UNITED STATES PATENT OFFICE 2,285,870

HINGE ASSEMBLY FOR THE BUCKETS OF DREDGER CHAINS

Thomas Parker, Kuala Lumpur, Federated Malay States

Application July 10, 1940, Serial No. 344,719
In Federated Malay States August 15, 1939

11 Claims. (Cl. 74—255)

The invention relates to hinge assemblies connecting pairs of adjacent buckets in dredger bucket chains in which one of the adjacent buckets has a pair of spaced eyes (hereinafter referred to as the outer eyes) while the other bucket has an eye (hereinafter referred to as the central eye) located between the pair of spaced eyes and in which there is a hinge pin extending through all three of the eyes.

In hinge assemblies as normally constructed the hinge pin is locked in the outer eyes and during the hinging movements the relative rotation takes place between the pin and the central eye. This arrangement has the disadvantage that it is difficult to seal the central bearing against loss of lubricant and entry of grit and water and that it is necessary to dismantle the whole assembly when it becomes necessary to replace worn parts. This disadvantage may be overcome—as has already been proposed—by so arranging the assembly that during the hinging movements there is relative rotation between the pin and the outer eyes and none between the pin and the central eye, the outer eyes being provided with bushes surrounding the ends of the pin and closed at their outer ends over the pin so as to prevent water or grit entering the bushes through the outer ends, and the inner ends of the bushes being sealed by packing material against loss of lubricant and entry of grit or water.

The present invention is concerned with hinge assemblies of the above kind (hereinafter referred to as the kind described) in which the relative rotation which takes place on hinging movement is between the ends of the pin and the outer eyes, and the main object of the invention is to provide, in an assembly of the kind described, improved means for sealing the inner ends of the bucket-pin bushes.

Accordingly the invention provides, in a dredger bucket-pin assembly of the kind described, the combination of a bucket-pin whereof the ends are reduced in diameter to form journals, bushes which are secured in the outer eyes, embrace the reduced end portions of the pin and are closed at their outer ends, and rings of resilient packing material located in gaps between the open ends of the bushes and the shoulders formed on the pin where it is reduced in diameter.

In a preferred form of the invention metal bearing rings are also located in the gaps aforesaid and arranged to form a metal-to-metal seal against the pin. The rings of resilient packing material may be compressed between the open ends of the bushes and the shoulders formed on the pin where it is reduced in diameter, the metal bearing rings being interposed between the shoulders on the pin and the resilient packing rings to form a metal-to-metal seal against the shoulders on the pin. In one form of the invention the metal bearing rings are of angle-section, being interposed between the resilient packing rings and the shoulders on the pin and adjacent peripheral portions of the journal ends of the pin.

Other features of the invention are embodied in the following example, with modifications thereof, which will now be described with reference to the accompanying drawings in which Figure 1 is a side view showing a hinge assembly connecting a pair of adjacent buckets in a dredger chain;

Figure 2 is a section on the line II—II in Figure 1;

Figure 3 is a section on the line III—III in Figure 1 but showing the outside view of the bush and sealing ring;

Figure 4 is an enlarged view showing the arrangement of the sealing ring;

Figure 5 is a section showing one of the bushes, on the line V—V in Figure 2;

Like reference numerals indicate like parts in the several figures of the drawings.

Figure 6:
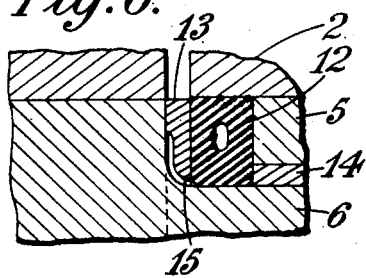
Figures 6 to 11 are sections similar to Figure 4 but showing details and modifications of the arrangement of the packing ring and associated parts.

The hinge assembly shown in the drawings connects a pair of adjacent buckets in a dredger chain which moves, in operation, in the direction of the arrow in Figure 1. The leading bucket of the pair has a single eye 1 which is the back eye of the bucket and the other bucket has a pair of front eyes 2. The eye 1 is the central eye of the assembly and the eyes 2 are the outer eyes. In this example the eye 1 is provided with a bush 3 within which is received the central portion of the hinge pin 4.

The outer eyes 2 are each provided with a bush 5 which receives the corresponding end 6 of the hinge pin and which is closed at its outer end. The ends 6 of the hinge pin have a diameter less than the central portion of the pin, there being shoulders 7 formed on the pin where the diameter is reduced. The outer diameter of the bushes 5 is slightly greater than the diameter of the central portion of the pin so that, before the bushes are inserted in the eyes 2, the pin may be threaded through those eyes into the central eye 1.

The bushes 5 are readily removable and they are provided with radially extending tongues 8 cast or welded on the bushes. These tongues are secured by bolts 9 to the eyes 2 to lock them in place, the holes in the eyes for the bolts being drilled into the eyes themselves or, as shown, into blocks welded to the eyes. To assist in the removal of the bushes screw-threaded holes 10 are provided in their closed ends for the insertion of tap bolts which may be screwed against the end of the hinge pin to force the bushes outwardly. The holes 10 may normally be closed by plugs. The closed ends of the bushes are also provided with nipples 11 and non-return valves for the insertion of lubricant into the bushes.

The bushes 5 are sealed at their inner ends by means of packing rings 12 of rubber or other suitable material. These rings which may be of hollow or solid cross-section are clamped between the inner ends of the bushes 5 and the shoulders 7 on the hinge pin. To reduce wear on the sealing rings, rings 13 of metal or other wear-resisting material are provided between the shoulders 7 and the sealing rings as shown in detail in Figure 4. Figure 4 also shows that the dimensions of the sealing rings are such that they bear against the inside of the eyes 2 and against the periphery of the reduced ends 6 of the hinge pin.

The rings 13 are pressed into engagement with the shoulders 7 by the resiliency of the sealing rings and owing to the frictional grip of the sealing rings on the rings 13 there is little or no relative movement between the rings and wear of the sealing rings is reduced. The rings 13 are a close fit against the shoulders 7 and therefore contribute to the effective sealing of the bearing. The rings are preferably formed with grooves 15 as shown in Figure 6 to allow any lubricant which leaks from the bearing to pass between the face of the ring and the shoulder against which it bears and to lubricate these surfaces.

As shown in Figure 5 the bushes 5 have a detachable liner 14 over that half of the internal surface where the maximum wear occurs.

In the erection of the dredger chain the eyes 1 and 2 are brought into line and the pin 4 is then inserted and the sealing rings 12 with the rings 13 slipped into position. The bushes 5 are then inserted into the eyes 2 and locked in position by means of the bolts 9. If after the dredger has been in operation for some time it becomes necessary to replace the liners 14 the bushes 5 can be removed without removing the pin 4 and without disconnecting the buckets from the chain.

It is to be understood that the bushes 5 not only provide bearing surfaces for the pin but they also serve to prevent axial displacement of the pin. If it is desired to increase the bearing area of the bushes this may be effected by increasing the width of the outer eyes and decreasing that of the central eye a corresponding amount.

The modifications in the above example shown in Figures 7 to 11 will now be described.

Figure 7:
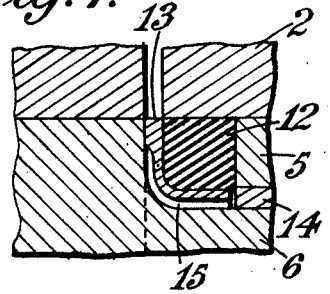

In the arrangement shown in Figure 7 the ring 13 is of angle section and receives two sides of the substantially square-sectioned sealing ring 12 within the angle thereby protecting the sealing ring against wear due to relative movement between the sealing ring and the pin. The ring 13 is provided with oil grooves 15 as in the previous example.

Figure 8:
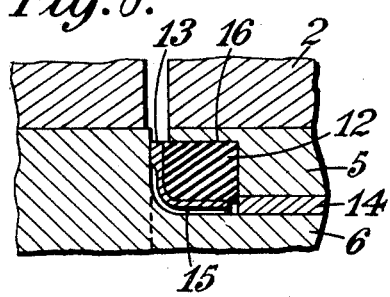

The arrangement shown in Figure 8 is similar to that shown in Figure 7 except that the outside of the bush 5 is extended to form a housing around the rubber sealing ring, as shown at 16, thus permitting the device to be applied to outer eyes that have stretched, or are likely to stretch, which is quite common when the buckets are used for digging in heavy ground.

Figure 9:
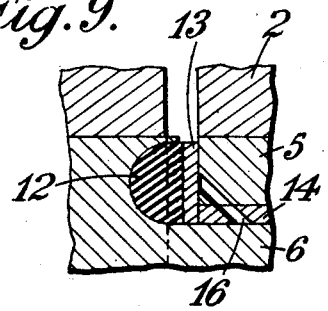

Figure 9 shows an alternative arrangement in which the rubber sealing ring 12 is housed in a recess cut into the pin. The frictional grip of the rubber on the ring 13 rotates the ring against the machined and ground end of the bush 5 which is provided with oil ducts 16 to lubricate the sealing faces.

Figure 10:
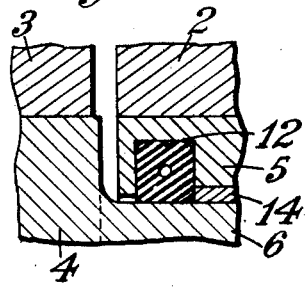

In the modification shown in Figure 10 the end of the bush 5 is recessed to house the rubber sealing ring 12. In this construction the renewable half liner 14 is made in two parts to permit entry into the bush and is afterwards pinned in place. It will be appreciated that with this arrangement the shoulder on the pin is not essential and that the pin may, if desired, be of uniform diameter throughout its length.

Figure 11:
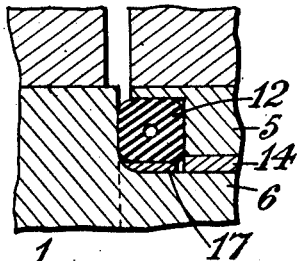

Figure 11 shows an arrangement in which the rubber sealing ring makes sealing contact against the shoulder of the pin, and in which contact of the sealing ring and the circumference of the stepped down portion of the pin is prevented by a loose metal slip ring 17 which will permit lubricant to pass from the bush to the sealing face on the shoulder of the pin.

It is to be understood that many varieties of rubber will absorb lubricant and tend to swell thus maintaining the seal in spite of considerable wear and that one object of the metal rings 13 and 17 is to reduce friction and prevent a tearing action on the rubber should the swelling or compression be excessive.

Figure 12:
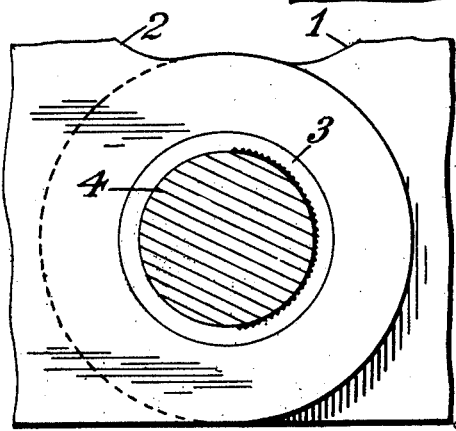
Figure 12 is a side view of a modification of the central eye which may be employed in any of the arrangements shown in Figures 1 to 11.

The invention is not restricted to the precise constructional details set forth in the above examples. Thus instead of relying upon the very considerable friction between the pin 4 and the eye 1 under the load on the pin to prevent rotation of the pin in the eye there may be provided means for increasing this friction or for positively locking the pin in position in the eye. These means may consist, for example, of serrations formed on the inside of the eye as shown in Figure 12 or of a serrated or toothed block held in the eye and having its serrated or toothed surface pressed into engagement with the pin.

An advantage of the construction according to the invention is that since the pin does not rotate in the central eye it is unnecessary to provide an expensive manganese steel bush for that eye and to grind the eye accurately to fit the bush as is at present necessary. It is, in fact desirable when carrying out the present invention to leave the internal surface of the central eye in the rough condition to increase the friction between it and the pin. It is a further advantage of the present construction that the provision of an L-head on the pin is not required.

I claim:

1. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, and rings of resilient packing material located in gaps between the open ends of the bushes and the shoulders formed on the pin where it is reduced in diameter, said rings being compressed by the shoulders and by the reduced end portions of the pin.

2. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, rings of resilient packing material located in gaps between the open ends of the bushes and the shoulders formed on the pin where it is reduced in diameter, and metal bearing rings also located in the gaps aforesaid and arranged to form a metal-to-metal seal against the reduced end portions of the pin.

3. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, rings of resilient packing material compressed between the open ends of the bushes and the shoulders formed on the pin where it is reduced in diameter, and metal bearing rings interposed between the shoulders on the pin and the resilient packing rings to form a metal-to-metal seal against the shoulders on the pin, said packing rings being compressed by the bearing rings and by the reduced end portions of the pin.

4. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, rings of resilient packing material which are in compression between the open ends of the bushes and the shoulders formed on the pin where it is reduced in diameter and which bear against the inside of the outer bucket eyes and against the peripheries of the journal portions of the pin, and metal bearing rings interposed between the shoulders on the pin and the resilient packing rings.

5. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, rings of resilient packing material in compression between the open ends of the bushes and the shoulders formed on the pin where it is reduced in diameter, and angle-shaped metal bearing rings interposed between the resilient packing rings and the shoulders on the pin and adjacent peripheral portions of the journal ends of the pin.

6. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, rings of resilient packing material located in gaps between the open ends of the bushes and the shoulders formed on the pin where it is reduced in diameter, and metal bearing rings also located in the gaps aforesaid and arranged to form a metal-to-metal seal against the pin, the bearing rings being provided with grooves adapted to permit the passage of lubricant from the inner ends of the bushes to the bearing surfaces of the bearing rings.

7. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends and at their inner ends are formed with axially extending rims and rings of resilient packing material in compression between the open ends of the bushes and the shoulders formed on the pin where it is reduced in diameter and bounded circumferentially by the aforesaid rims on the inner ends of the bushes.

8. In a dredger bucket-pin assembly of the kind described in which the pin extends through a central eye in one bucket and has its ends received in and rotatable in relation to spaced outer eyes in the other bucket, the combination of a bucket-pin whereof the ends are reduced in diameter to form journals, bushes which are secured in the outer eyes, embrace the reduced end portions of the pin and are closed at their outer ends, and at the parts of the internal surface where the greatest wear occurs are provided with replaceable liners, and rings of resilient packing material located in gaps between the open ends of the bushes and the shoulders formed on the pin where it is reduced in diameter.

9. In a dredger bucket-pin assembly of the kind described in which the pin extends through a central eye in one bucket and has its ends rotatable in two spaced outer eyes in the other bucket, the combination of a bucket-pin whereof the ends are reduced in diameter to form journals and whereof the shoulders formed on the pin where it is reduced in diameter are provided each with a circumferential recess, bushes which are secured in the outer eyes, embrace the reduced end portions of the pin and are closed at their outer ends, and rings of resilient packing material which are received in the aforesaid circumferential recesses in the pin shoulders and are in compression between said recesses and the open ends of the bushes.

10. In a dredger bucket-pin assembly of the kind described in which the pin extends through a central eye in one bucket and has its ends rotatable in spaced outer eyes in the other bucket, the combination of bushes which are secured in the outer eyes, embrace the end portions of the pin, are closed at their outer ends and near their inner ends are provided each with a circumferential groove, and rings of resilient packing material received within the aforesaid circumferential grooves in the bushes and arranged to bear against the surface of the pin.

11. In a dredger bucket-pin assembly in which a stepped-down end portion of the bucket-pin is rotatable within a bush which is closed at its outer end and is embraced by and secured in a bucket eye, means for sealing the inner end of the bush comprising the combination of a ring of resilient packing material in compression between the inner end of the bush and the shoulder formed on the pin where it is stepped-down in diameter, and a metal bearing ring interposed between the resilient ring and the reduced portion of the pin bounded by the resilient ring.

THOMAS PARKER.